United States Patent [19]

Feller

[11] Patent Number: 4,612,806
[45] Date of Patent: Sep. 23, 1986

[54] ORBITAL BALL FLOW DETECTION APPARATUS

[76] Inventor: Murray F. Feller, Box 1247, Dunnellon, Fla. 32630

[21] Appl. No.: 667,766

[22] Filed: Nov. 2, 1984

[51] Int. Cl.[4] ............................................. G01F 1/32
[52] U.S. Cl. ................................ 73/195; 73/861.05; 73/861.32; 73/861.77
[58] Field of Search ........... 73/861.05, 861.32, 861.77, 73/202, 195, 255; 250/203

[56] References Cited

U.S. PATENT DOCUMENTS

| | | | |
|---|---|---|---|
| 3,217,539 | 11/1965 | Owen et al. | 73/861.77 |
| 3,517,167 | 6/1970 | Bell | 250/203 |
| 3,861,210 | 8/1974 | Griverus | 73/861.32 |
| 4,157,660 | 6/1979 | Spacek | 73/861.05 |
| 4,343,191 | 8/1982 | Cairenius | 73/255 |

FOREIGN PATENT DOCUMENTS

| | | |
|---|---|---|
| 0070152 | 7/1982 | European Pat. Off. . |
| 1438905 | 12/1966 | France . |
| 2071340 | 3/1980 | United Kingdom . |
| 2135446 | 2/1983 | United Kingdom . |

Primary Examiner—Herbert Goldstein

[57] ABSTRACT

The disclosed orbital ball flow detectors include a photoelectric ball sensor applicable to both axial-flow and toroidal forms, wherein reflection occurs at the ball. Also disclosed are photoelectric ball sensors of both the transmission and reflection types in which the light path extends through pellucid material of the passage means that forms a track against which the ball bears as it orbits. There may be a swirl in the flow pattern of the fluid; and then multiple pairs of orbital ball flow detectors, each carrying part of the total flow and having mutually opposite orbit directions, provide improved accuracy.

17 Claims, 9 Drawing Figures

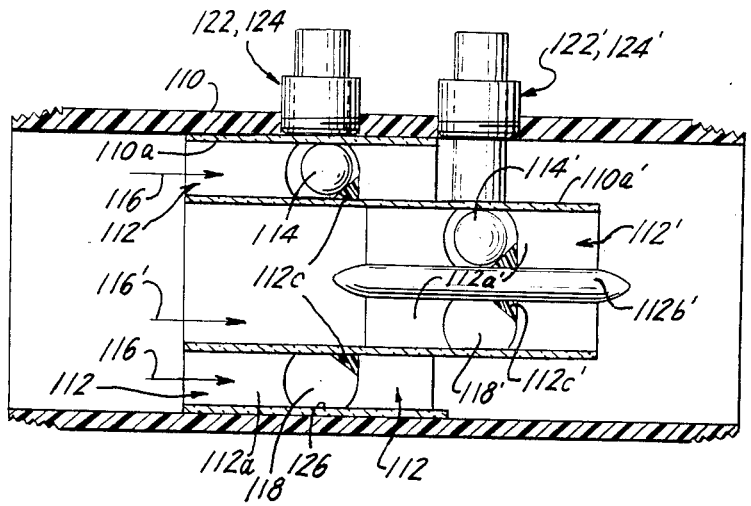
FIG.6
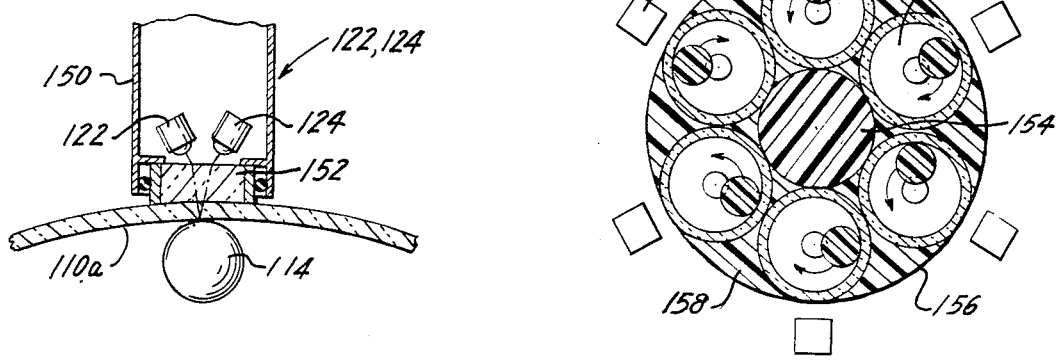
FIG.7
FIG.9
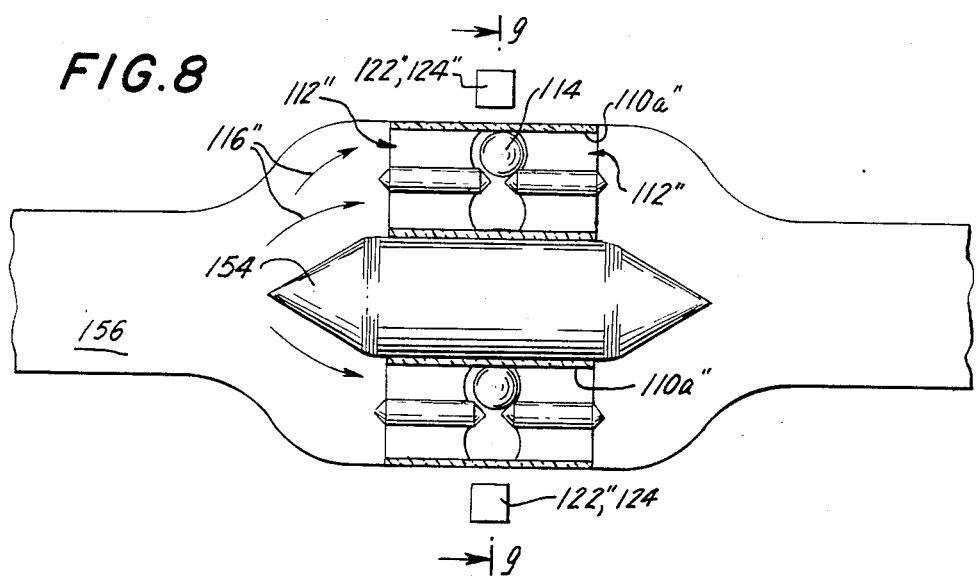
FIG.8

ORBITAL BALL FLOW DETECTION APPARATUS

BACKGROUND OF THE INVENTION

The present invention relates to apparatus for detecting fluid flow, as in apparatus for detecting or measuring the rate or the volume of flowing fluid. In particular, this invention relates to so-called "bearingless" or orbital-ball flow detection apparatus.

Generally there are two types of flow detectors that utilize a fluiddriven orbital ball. In one type, which may conveniently be called the "axial-flow" type, the fluid flows along a generally cylindrical passage. Vanes in the passage develop a lengthwise spiraling flow pattern. The orbital ball is constrained to travel along a circular race or track around the axis of the passage. The spiralling flow pattern causes the ball to orbit past the ball sensor. In another type, which may conveniently be called the "toroidal" type, a ball moves along the toroidal flow passage past a sensor. The fluid enters the toroidal passage tangentially and the fluid leaves the toroidal passage along a tangential path or along an axial exit port. U.S. Pat. No. 3,861,210 issued Jan. 21, 1975 to T. L. B. Griverus discloses both axial-flow and toroidal types of orbital ball flow detectors.

Magnetic and other forms of ball sensors have been used in orbital ball flow detectors. Photoelectric ball sensors are known in toroidal-type flow detectors, as in U.S. Pat. No. 3,861,210, supra. With photoelectric ball sensing, the ball need not have critical physical properties required by other sensors. Accordingly, there is greater freedom of choice of material for the ball. For example, the density of the ball can closely approximate the density of the liquid flowing in the flow detector, for extending the linearity of flow rate versus orbital frequency over a wider range of flow rates. Heretofore, the use of photoelectric ball sensors in orbital ball flow detectors has apparently been limited to the toroidal type of flow detector.

SUMMARY OF THE INVENTION

A broad object of the invention resides in improving orbital ball fluid flow detectors having photoelectric sensors for the orbital ball. The term "photoelectric" is used herein broadly to refer to any light-sensitive electrically responsive detectors.

In one aspect of the invention, the ball sensor in orbital ball flow detectors comprises a light source and a photoelectric ball sensor related to each other and to the path of the orbital ball so that light from the source entering the flow passage is dissipated except when the ball is in a ballsensing position; and in that position, light from the source is reflected to the sensor by the ball. A ball that is white is excellent, but balls of somewhat translucent material such as ordinary somewhat translucent polypropylene is also quite satisfactory in either clear fluid such as water or dark fluid such as fluid petroleum. This feature of the invention provides a practical photoelectric orbital ball sensor in the "axial-flow" type of orbital ball flow detectors. The feature of a reflective photoelectric orbital ball sensor also provides a highly effective orbital ball sensor in toroidal orbital ball flow detectors, adapting them for use with both transparent liquid such as clear water and dark fluids such as petroleum. This type of orbital ball sensor is remarkably free of critical materials, dimensions and circuits, and it provides strong output pulses. The light transmitting material that forms the boundary of the fluid passage, protecting the light source and the light sensor from the fluid, may be either transparent or translucent, i.e. pellucid.

Another aspect of the invention resides in improving orbital ball flow detectors generally, including both the axial-flow type and the toroidal type. In known photoelectric orbital ball flow sensors, light from the source traverses the path of the orbital ball to reach the light sensor. The boundary of the fluid-flow passage is a transparent wall. The light path is periodically interrupted by the ball as it orbits. The surfaces of the transparent walls that shield the light source and light sensor are initially clean and in that condition they form defined optical interfaces between the fluid and the transparent walls at the light source and the light sensor. In usual apparatus of this kind, contamination—dirt—from the fluid tends to accumulate in time on the wall exposed to the fluid. The accumulated deposit degrades the interface, first causing diffusion of the light entering the orbital path and ultimately blocking the light path. In accordance with a further aspect of the invention, the orbital ball is provided with a circular guiding track against which the ball bears as it orbits, the track being formed at least in part of the pellucid material that shields the light source and the light sensor from the fluid and forms the interface(s) between the shield(s) and the fluid. The interface is kept clear and clean and essentially free of contamination by the orbiting ball. This feature provides longtime sensitivity and stability in apparatus wherein the light path in the flow detector traverses the ball-orbiting passage.

The beam of light may bend at the interfaces where it enters and leaves the flow passage, and in such apparatus transparent wall material should be used. The bends of the light beam at each interface may well be critical. Apparatus of this kind may be disabled by light-diffusing contamination of the interfaces.

Light-diffusing contamination of the interfaces is a factor of controlling proportion in photoelectric orbital-ball flow detectors where the light path extends across the ball's orbital path, not only if there are bends in the light path, but even where the light enters and leaves the flow passage along a straight line.

Ultimately the deposit of contamination may degrade all orbital types of photoelectric ball sensors to the extent that transmission of light to the sensor is effectively blocked. When there is no significant sensed signal as the ball enters the light path, the ball detector is disabled. By orbiting the ball against the interfaces between the flow passage and the pellucid material that shields the light source and the light sensor, those interfaces are kept clear and clean.

The novel flow detectors in which ball sensing depends on a reflective light path (discussed above) may not be significantly affected by moderate degrees of contamination of the interface(s) of the light path into and out of the flow passage. This applies where there is only limited clearance between the ball and that (those) interface(s). However, performance of even that apparatus is improved by having the orbital ball bear against the areas of the pellucid wall through which the light enters the flow passage and leaves after reflection from the ball. For that result, the interface(s) form(s) part of a guiding track along which the ball travels. The orbiting ball bears against the interface(s) and keeps the interface(s) clean.

The performance of these and other flow detectors that depend on a light source/sensor form of ball detector are improved, pursuant to a further aspect of the invention.

Light-activated detectors of this kind are affected by the condition of various surfaces, by the nature of the light-transmitting materials and the light-reflecting materials used in the apparatus, and by the light-transmitting character of the liquid in the flow passage. Those factors may be expected to vary with passage of time. Moreover, the components used in a series of ostensibly identical ball-detector units have characteristics that may vary with time and may differ significantly from unit to unit. Light-emitting diodes, for example, may have significantly different levels of light output in response to a given electrical input.

The present invention provides a novel light emitter/light detector circuit that is stabilized against varied characteristics of different components used in a series of ostensibly duplicate ball detectors and stabilized against changes in performance of the detector components and of the whole orbital ball detector.

In the illustrative ball detectors detailed below, the ball detector includes an instantaneously current-responsive light emitter, a light sensor, and a high-gain amplifier responsive to the light sensor which acts both to provide controlled excitation current to the light emitter and signal output that represents orbits of the ball. This detector is useful more generally for detection of movable objects. However, it has special application to orbital-ball flow detectors where the light path is affected by the condition of the surfaces and materials providing the light path from the emitter to the sensor and, in some cases, by the nature of the liquid.

A further aspect of the invention is concerned with improving the accuracy of flow meters under varied anomalies of the flow pattern. The flow rates at different parts of the passage's cross-section may be different and their relationship may vary at different total rates of flow. Moreover, the flow pattern may develop a swirl which could vary at different flow rates, adversely affecting the accuracy of the flow detector. There might be no swirl in one installation, and a large amount of swirl in another installation; the direction of swirl could be different in separate installations, the swirl being variable at different flow rates.

This consideration is taken into account to some extent in my U.S. Pat. No. 4,399,696 issued Aug. 23, 1983. There, paired flow-sensor probes are described as sampling symmetrical parts of the cross-section of a passage, the paired probes having turbine-like rotors formed to rotate in opposite directions.

In apparatus illustrative of this aspect of the invention, the flow sensors include orbital balls that move along circular paths coaxial with a main flow passage. Swirl-inducing vanes in the flow passage induce the balls to orbit. Underlying this aspect of the invention, it is recognized that the accuracy of an orbital ball flow detector of this kind may be adversely affected by a preexisting swirl condition in the flow passage. The preexisting swirl may have the same sense or the opposite sense as the swirl developed in the flow detector, whereas the flow detector itself is routinely calibrated in a flow passage where there is normally no swirl.

In a flow detector detailed below, the main passage supplies a pair or multiple pairs of flow passages. Each of a pair of flow passages is equipped with orbital ball flow detectors, whose swirl-inducing vanes are slanted to induce the balls to orbit in opposite senses. The outputs are combined. Where the orbital-ball flow detectors of a pair are proportioned to carry equal volumes of liquid, the outputs of the pair or pairs of flow detectors are simply added, as in U.S. Pat. No. 4,399,696 (supra). Otherwise, they are combined in a suitable manner to weight the outputs in proportion to their separate flow-handling capacities.

The nature of the invention in its various aspects will be better understood and appreciated from the following detailed description of apparatus shown in the accompanying drawings, being illustrative embodiments of the various aspects of the invention.

In the drawings

FIG. 6 is a somewhat diagrammatic longitudinal cross-section of a novel flow detector having a pair of orbital ball flow sensors;

FIG. 7 is an enlarged portion of FIG. 6, showing internal details of a light source/sensor of FIG. 6;

FIG. 8 is a somewhat diagrammatic longitudinal cross-section of another novel flow detector having paired orbital ball flow sensors; and FIG. 9 is a cross-section of the flow detector of FIG. 8 at the plane 9—9 therein.

Figure 1:
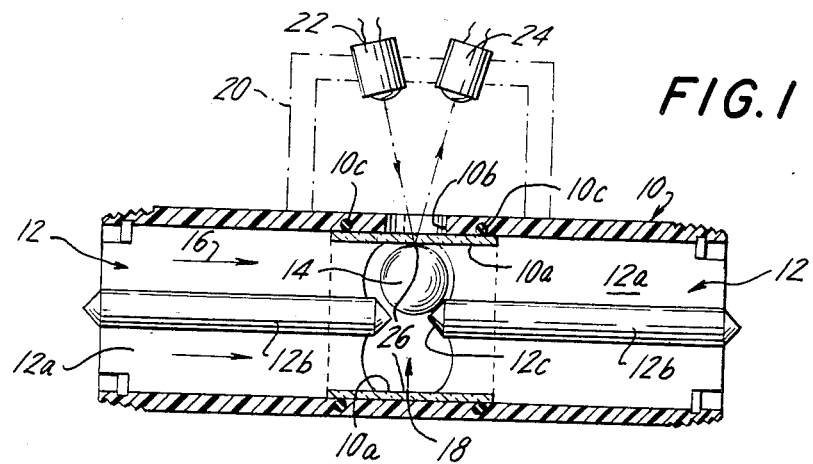
FIG. 1 is a longitudinal cross-section of a novel illustrative orbital-ball flow detector.

The flow detection apparatus of FIG. 1 includes a length of pipe 10 of metal or plastic containing two assemblies 12 of flow-spiralling vanes 12a that may be conveniently molded of one piece of plastic. The vanes 12a extend radially and integrally from axial rod 12b. All of the vanes of both sets slope or slant from end to end in the same direction. In an example, where there are four (4) vanes in each assembly 12, the radial leading edge of each of the vanes is displaced 135° about the axis of rod 12b relative to its downstream radial edge, downstream being designated by the arrows 16.

The up-stream end 12c of rod 12b that is part of the down-stream vane assembly 12 is a conical bearing surface. Pipe 10 has a cylindrical liner 10a of clear plastic that provides a continuous step-less circular track or bearing surface 26. Ball 14 is proportioned to bear against liner 10a and rod-end 12c when liquid flows down pipe 10 in the direction of arrows 16, and because of the spiral flow pattern created by vanes 12a, clockwise or counter-clockwise about the common axes of rods 12b, ball 14 orbits in a circular path 18.

At one place along the circular orbit of the ball, a hole 10b is cut through pipe 10. O-rings 10c provide seals about the axis of pipe 10 if needed. Liner 10a may additionally or alternatively be bonded to pipe 10 so as to prevent leakage through hole 10b.

Housing 20 (shown diagrammatically in phantom) is fixed to pipe 10 and supports two units of a ball detector. These units consist of light source 22 and light sensor 24. Each of these units advantageously has a lens focussed at the inner surface portion or track 26 that forms a continuous circular bearing surface for ball 14.

Light emitted by source 22 is reflected to sensor 24 by ball 14. For this purpose the ball advantageously has white coloring or it may be of any light opaque or even translucent material, natural polypropylene for example. When the ball is not at or close to the ideal reflection point, the light from source 22 enters the orbital path where it is dissipated. Sensor 24 produces a pulse in response to each orbital cycle of ball 14.

The track 26 is kept clean of dirt deposit and other contamination by the fluid, because of the slightly rubbing contact of orbital ball 14. For this reason, the output signal does not become attenuated over a period of time due to clouding or darkening of the track surface. Additionally, because the sensed light does not travel through the liquid, the sensed signal is influenced little if at all by the color of the liquid. Dark liquid such as natural petroleum could hardly be sensed by a detector that relies on light passing through the liquid from one side of the ball path to the opposite side of the path. Here because the light that is sensed is reflected from the ball and because the ball bears against the transparent track 26, the nature of the liquid has little if any effect on the light path.

If there were some clearance between the ball and the point at which light penetrates transparent wall 10a and is reflected by the ball so as to leave the wall, there would be only a thin layer of liquid penetrated by the light, and consequently the ball detection process would be operative except in case of liquid that is effectively opaque. However, as noted above, the apparatus of FIG. 1 has the further advantage of the track area penetrated by the entering-and-leaving light being kept clean and clear of contamination by the orbiting ball.

In the course of its orbit, ball 14 is subjected to all parts of the cross-section of the flow path. Therefore, even if there were variations in velocity of the liquid at different parts of the pipe's cross-section, the output pulses of the flow detector would represent the total flow.

Figure 2:
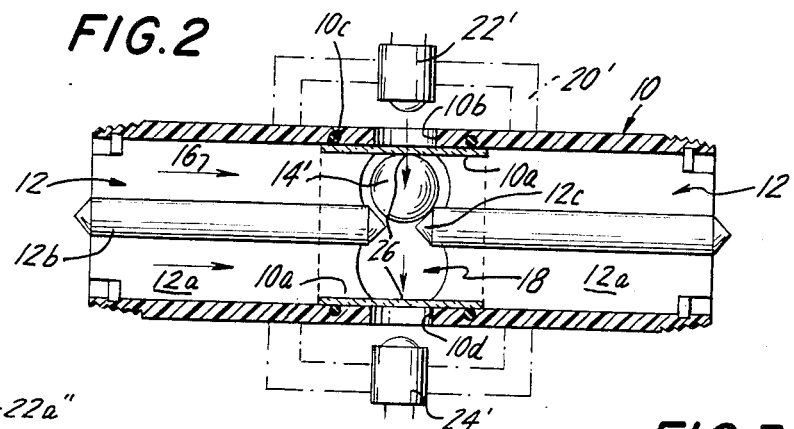
FIGS. 2 and 3 are longitudinal cross-sections of modifications of FIG. 1, these embodiments having certain novel features in common.

FIG. 2 represents a modification of FIG. 1. The identical parts bear the same numbers, and corresponding parts that are similar are represented by primed numbers. A full detailed description is omitted in the interest of conciseness.

Light from source 22' enters pipe 10 via hole 10b, and penetrates transparent liner 10a. Track 26, being the inside surface of liner 10a against which ball 14' bears as it orbits, is kept clear of contamination by the orbiting ball. Light sensor 24' is located diametrically opposite light source 22' (or displaced by some other angle) so as to receive light through the liquid and hole 10d when the beam is not obstructed by the ball. Two pulses result from each orbit of the ball. For this purpose the ball may have almost any light-transmitting, refracting, blocking or scattering properties. This apparatus is limited for use with transparent liquid.

Figure 4:
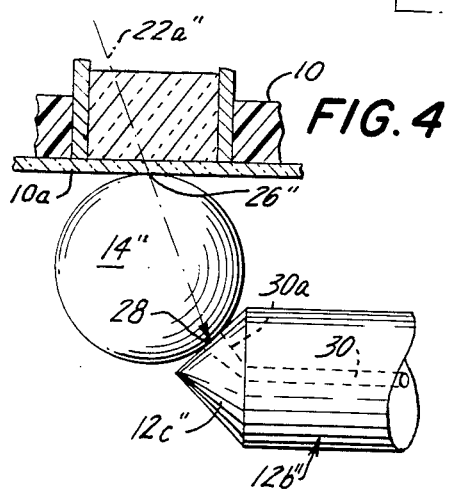
FIG. 4 is an enlarged detail of FIG. 3.
Figure 3:
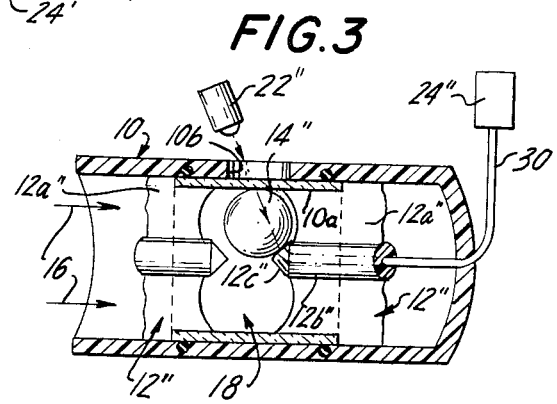

The flow sensor of FIGS. 3 and 4 represents yet another modification. The same numbers are used in FIGS. 3 and 4 as in FIG. 1 for the same parts, and double-primed numbers are used for like parts. Only part of the description is repeated. In FIGS. 3 and 4, ball 14 bears against both tracks provided by liner 10a and conical rod-end 12c, so that ball 14" keeps both tracks clean as it orbits. Light source 22" directs light toward an end 30a (FIG. 4) of light conductor 30. Light-admitting end 30a is flush with and forms a small part of the bearing track provided for the ball by rod end 12c". Light conductor 30 terminates at light sensor 24". Well-known details of fiber optics are used.

In one form, ball 14" may be transparent or even translucent, and the fluid may be opaque. Light that is suitably directed by source 22" will be sensed by light sensor 24" after refraction and transmission through the ball. When the ball is elsewhere in its orbit, the light will not be directed to end 30a of the light conductor 30 and will be dissipated.

In a further modification of FIGS. 3 and 4, the liquid whose flow is to be sensed may be transparent, and then light from source 22" will be directed so that it reaches part 30a after transmission through the liquid. Balls of various properties (opaque, highly refractive, etc.) entering the light-transmission path will divert or obstruct the beam. The ball will cause a pulse to be produced for each orbital cycle.

Figure 5:
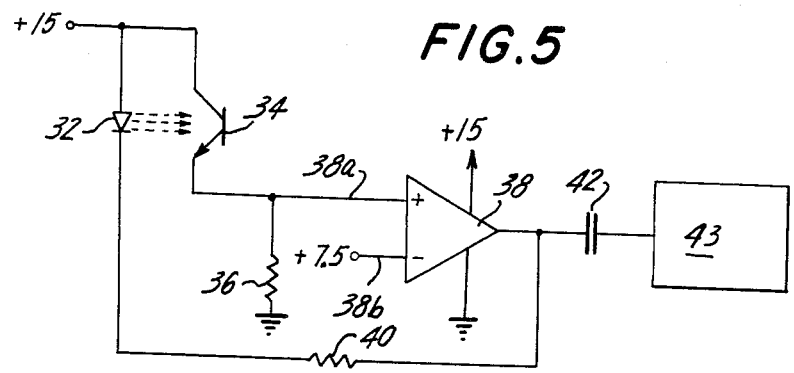
FIG. 5 is a circuit diagram of a novel light source/sensor unit that is especially effective for sensing the orbital ball in the apparatus of FIGS. 1–4.

A detector circuit especially useful in FIGS. 1–4 is shown in FIG. 5. A solid-state current-responsive light emitter 32 that is instantaneously responsive to the applied excitation represents sources 22, 22' and 22", diode photoemitter type F4D2 (General Electric) being illustrative. Light sensor 34 such as solid-state detector type L14G1 (General Electric) represents sensors 24, 24' and 24". Light sensor 34 is in series with resistor 36 to produce input to the (+) input 38a of high-gain operational amplifier 28 whose other input 38b has fixed bias, e.g. +7.5 volts. The output of amplifier 38 is connected in a feedback loop through resistor 40 to diode light-emitter 32. This is a negative feedback loop, in the sense that increased light output of the emitter to the light sensor tends to produce increased input (upward d-c shift) to the high-gain amplifier; and the resulting rise (upward d-c shift) of the amplifier's output decreases the voltage across the loop 32, 40. The result is a decrease in the excitation to the light emitter. A stabilized state is reached that takes into account the conditions of the circuit and its components. The feedback also takes into account the condition of the light path between the light emitter and the light sensor including the condition of the fluid passage area(s) through which the light passes and the degree of transparency of the liquid. The circuit also attains a stabilized highly sensitive condition despite drifts in the characteristics of the circuit components and variations in the state of the materials in the light path. Capacitor 42 at the output of amplifier 38 provides pulses that represent sudden changes in the feedback to light emitter 32. The pulses are accumulated in a register 43 to represent the total volume of flow. Unit 43 may also include a flow rate indicator.

The feedback loop tends to establish a steady-state light-output-input condition of emitter 32 and sensor 34, taking into account the variations of the particular characteristics of components 32 and 34. When a ball 14, 14' or 14" enters the beam in FIGS. 1, 2 or 3, there is a change such that the feedback loop "tries" to restore the same light input to photodetector 34. That change in signal to the feedback loop results in an output pulse from capacitor 42. This circuit is highly stabilized, accommodating components having widely different characteristics and, in so doing, yields high levels of output signal in response to an orbiting ball. The circuit stabilization is an advantage in many moving-object detectors, such as an automatic dooropening control, a burglar alarm, etc. However, it has particular advantage in the orbital ball flow detector where conditions of light-transmission may change with time and wear.

Variations in the pattern of flow approaching a flow detector may result in inaccuracies, such as deviations from linearity over the range of flow rates to be monitored. The apparatus of FIG. 6 represents an application of the flow detector of FIG. 1 to minimize error due to a swirling pattern of flow in the duct or pipe approaching the flow detector. That swirl pattern may vary at different flow rates. The flow detectors of FIG. 2 and FIGS. 3 and 4 may also be used as coaxial pairs of flow detectors as in FIG. 6.

In FIG. 6, an outer set of parts corresponding to FIG. 1 have 100-series numbers corresponding to the part numbers of FIG. 1, and parts of an inner set similarly have 100'-series numbers. Accordingly, much of the construction and operation of the apparatus of FIG. 6 will be understood without repeated description.

In FIG. 6, photo-emitter/photodetector 122/124 is provided for an outer orbital ball 114. Ball 114 bears against a cylindrical transparent liner 110a of pellucid plastic as it orbits, and the orbiting ball also bears against circular race 112c. Liquid flows in the direction of arrows 116 toward ball 114 between outer and inner cylindrical walls 110a and 110a'. Correspondingly, liquid flows in the same direction through the inner orbital ball flow detector (identified with primed numbers) between inner wall 110a' and race 112c'. However, the upstream set of vanes 112' and the downstream set of vanes 112' for setting up a swirling flow pattern for the inner orbital ball 114' have a slant that is opposite to the slant of the upstream and downstream sets of vanes 112. Consequently, the two balls 114 and 114' orbit in mutually opposite directions.

The cross-sections of the flow paths of the inner and outer orbits optimally are equal. Each flow detector is calibrated in terms of pulses per gallon. If the slant angle of the inner and outer sets of vanes 112 and 112' are the same, the inner and outer flow detectors would have different lengths of orbital path and would tend to have very different pulse rates per gallon. Using computer hardware or analog circuit techniques, the output of the two flow detectors can be combined to yield an accurate total flow rate.

In a particular installation, there may be a swirling pattern of flow approaching the entire flow detector of FIG. 6. Additionally, the flow rate near the axis of pipe 110 may differ from the flow rate near the wall of pipe 110. The combined inner and outer orbital ball sensors of FIG. 6 respond to the total flow across the entire cross-section of the pipe. Possible error due to the swirling flow pattern is essentially nullified by the opposite-angle spiralling vanes of the inner and outer orbital-ball detectors. The aggregate flow is represented by the output of the two orbital ball detectors despite different flow velocities that may develop at different portions of the pipe's cross-section. For larger passage cross-sections, successively smaller pairs of coaxial orbital ball flow detectors may be used for improved accuracy.

FIG. 7 represents the source/sensor assembly 122/124 as well as 122'/124' of FIG. 6. In FIG. 7, a tube 150 contains suitably supported photoemitter 122 and photodetector 124 which may be components 32 and 34 (FIG. 5) and may be connected in the circuit of FIG. 5. Emitted light and reflected light penetrates transparent member 152 and liner 110a, refracted as it enters and leaves. Suitable liquid seals are to be provided to prevent liquid from leaking and (as in FIGS. 1–4) the photo-emitter and photodetector are shielded against exposure to the liquid. Ball 114 keeps the track clean at the inside surface of liner 110a where the light is directed and reflected.

FIGS. 9 and 10 represent a further alternative that is useful for accurate flow measurements in a duct having a large cross-section. The main flow passage 156 is connected by a transition from a cylindrical pipe into an annular passage containing six equal cylindrical passages,. The fluid of passage 156 is divided so as to extend within and outside of those six passages. Six flow detectors like FIG. 1 are used for the six passages. At the axis of the six passages there is a core 154. Transparent cylindrical outer walls 110a'' provide an outer track for the orbital balls 114''. Upstream and downstream, flow-swirling vane assemblies 112'' (like the vane assemblies 12 of FIG. 1) are included in each of the six flow passages. However, for improved accuracy (against the possibility of a swirl in the flow pattern in pipe 156) the direction of swirl produced in each of the six orbital ball detectors is opposite to that of its neighbors, as indicated by arrows in FIG. 9. The six orbital ball detectors have respective light-emitter/ detector units 112'', 114'' that are the same as those of FIGS. 1–5 and 7. The outputs of emitter/detectors 122''/124'' in FIGS. 9 and 10 are suitably combined in obtaining an accurate measure of volume or rate of flow. Thus, for obtaining a measure of volume, the impulses of all emitter/detector units 122''/124'' are simply accumulated together, as in my U.S. Pat. No. 4,399,696 issued Aug. 23, 1983. The flow rate is the combined number of impulses during a measured time interval, controlled by a timer.

The spaces around the six flow detectors of FIGS. 8 and 9 may be left open for carrying part of the total flow. While that part of the flowing fluid is not passed through the flow detectors, the accuracy of the measurement may be adequate. Leaving the flow passages around the six flow detectors open to carry some of the total flow reduces the pressure-drop of the apparatus. In an alternative, the passages between the six flow detectors of FIGS. 8 and 9 are closed off. The six flow detectors then subdivide the total flow, and their total output represents metering of all of the fluid flowing through the apparatus.

In one respect, the present invention extends photoelectric sensing of an orbital ball to the axial-flow type of orbital ball flow detectors.

In a further respect, the invention provides a novel photoelectric orbital ball detector that utilizes reflection from the ball, thus not being dependent on forming a light path through liquid whose flow is to be monitored. In a further respect, the invention relates the light path of a photoelectric ball detector to an area or areas of the race or track against which the orbital ball is induced to travel, keeping the surface or interface clean. Notably, an orbital ball detector having special merit results when the ball detector depends on reflection and when the light path extends through an area along a bearing track of the orbital ball that is kept clean and clear by the orbiting ball. Still further, the light emitter and sensor are in a stabilized circuit that establishes and maintains high sensitivity to the orbiting ball, despite initial anomalies of the components of the apparatus and despite changes that may occur.

The foregoing features of the invention are shown to have great advantage in the axial-flow type of orbital ball flow detectors represented by the illustrative embodiments. However, it will be recognized that the same features have corresponding advantage in toroidal orbital ball flow detectors mentioned above and disclosed in U.S. Pat. No. 3,681,210 (supra).

In another respect, the invention provides axial-flow orbital ball flow detectors that are virtually immune to swirl of the flow to be monitored.

In each flow detector mentioned above, it is to be understood that the material of the ball is to be selected for zero buoyancy where a wide range of proportionality is required between flow and orbital frequency, i.e. linearity of response. This presumes use of the apparatus with liquid. However, the novel orbital ball flow detectors are also useful for monitoring flow of gaseous fluids such as air or steam. In using orbital flow detectors for monitoring gas-flow, it is desirable for the orbital axis to be vertical.

In FIGS. 6–9, axial-flow orbital ball flow detectors are shown with photoelectric ball sensors. However, other forms of ball sensors may be substituted, such as the capacitive orbital ball detectors in my application Ser. No. 06/510,810.

It will be noted that an orbital ball in that detector bears against a wall to which a capacitive electrode is mounted. There, the effect of the ball pressing against that wall as it orbits is for the purpose of assuring uniform capacitive effect as the ball orbits. In the case of the present photoelectric orbital ball sensors, the bearing of the ball against the pellucid wall area(s) is for the very different purpose of keeping the light path clear of contamination.

It will be apparent that a range of variation in the arrangements represented by the illustrative embodiments may readily be introduced by those skilled in the art. Consequently, the invention should be construed broadly in accordance with its true spirit and scope.

What is claimed is:

1. Flow detection apparatus including means defining a fluid-flow passage and a flow-activated ball, said apparatus comprising track means for establishing an orbital path for said ball, said track means being formed at least in part of pellucid material, and ball detection means including a light source and a light sensor arranged along a light path that extends from said light source through said pellucid material to said orbital path and from said orbital path through said pellucid material to said light sensor, said apparatus further including means for directing fluid flowing in the passage so as to induce the ball to travel around said orbital path and to bear against the track means at least where said light path extends through said pellucid material to and from the orbital path, whereby the ball tends to prevent accumulation of contamination on the pellucid material of the track means at the light path.

2. Flow detection apparatus as in claim 1, wherein said track means includes a pair of tracks and wherein the light source and light sensor are arranged along a light path extending through areas of both of said tracks.

3. Flow detection apparatus as in claim 1, wherein the light source and the light sensor are related to the track means so that said light path is intercepted twice by the ball in traveling once around said orbital path.

4. Flow detection apparatus as in claim 1, wherein the light source and the light sensor are so related to each other and to said track means that said light path extends to and from a single sensing position along the orbital path, different amounts of light reaching the light sensor in dependence on the ball being in or out of the sensing position.

5. Flow detection apparatus as in claim 1, 3 or 4, wherein said fluid-flow passage defining means includes an essentially cylindrical wall, a portion of which constitutes a circular track against which the fluid induces the ball to bear, said circular track being part of said track means.

6. Flow detection apparatus as in claim 1, 3 or 4, wherein said fluid-flow passage defining means includes an essentially cylindrical wall, a portion of which constitutes a circular track against which the fluid induces the ball to bear, said circular track being part of said track means, and wherein said fluid-directing means comprises vanes disposed in the fluid-flow passage at least in advance of the orbital path of the ball for developing a lengthwise spiralling pattern of flow within the wall about the axis of the track.

7. Flow detection apparatus as in claim 6, wherein said ball is of a character to obstruct the light path when interposed between said areas.

8. Flow detection apparatus as in claim 6, wherein said ball is of a character to be part of the light path when interposed between said areas.

9. Flow detection apparatus including means forming a flow passage, a flow-responsive element variably operable cyclically by fluid flowing at various rates in the passage, and detector means for providing output signals representing the operation of said element, said detector means including a light emitter and a light sensor arranged to receive light from said light emitter along a light path that is modified periodically by said flow-responsive element and circuit means for producing said output signals in response to the combined effects of the light emitter and the light sensor and the light path as modified by said element, said circuit means including feedback circuit means for providing excitation for said light emitter in accordance with the inverse of said output signals, both said light emitter and its excitation feed-back circuit characteristically providing output varying at least approximately in time with said output signals, and means for utilizing said output signals as a representation of fluid flow.

10. Flow detection apparatus as in claim 9, wherein said flow passage-forming means provides an axial-flow passage and wherein an orbital ball constitutes said flow-responsive element, said apparatus including circular track means for guiding said ball around a circular orbit coaxial with said passage, and flow-swirling means for inducing said orbital ball to travel around said circular orbit and to bear against a circular track portion of said circular track means, said light path between said light emitter and said light sensor intersecting said track portion.

11. Flow sensing apparatus as in claim 10, wherein the light path involves reflection from the ball when present at the intersection of the light path and said track portion.

12. Flow sensing apparatus as in claims 9 or 10, including an operational amplifier, said light sensor being connected to an input of said operational amplifier and said means for providing excitation for said light emitter including an impedance in series with said light emitter connected to the output of said operational amplifier.

13. Flow detection apparatus including an orbital ball, means defining a fluid flow passage incorporating track means for establishing an orbital path for the ball and means for inducing the ball to move cyclically around said orbital path and, as it moves, to bear against a circular track that constitutes part of said track means, and a detector for said ball including a light emitter and a light sensor arranged to provide a reflective light path to and from the ball at a sensing portion of said circular track against which the ball bears in moving around said orbital path.

14. Flow detection apparatus including a flow-activated ball, means defining a fluid flow passage incorporating track means for establishing an orbital path for said ball and means for inducing the ball to move cyclically around said orbital path and, as it moves, to bear against a circular track portion of said track means, and ball detection means including a light source and a light sensor arranged along a light path from the light source to the light sensor to and from the circular track portion against which said ball bears in moving around its orbital path, at least that part of the circular track portion which is in said light path being of pellucid material.

15. An orbital ball flow detector, including means forming an inlet flow passage; at least one pair of axial-flow orbital ball flow detectors, each flow detector having means defining an axial-flow passage, an orbital ball and an orbital track for guiding the ball in a circular track coaxial with said axial-flow passage, and vane means for causing the fluid to swirl as it flows axially; and means providing a transition between the inlet passage and the multiple axial-flow passages; the swirl-causing vane means of said pair of flow detectors being arranged to cause the balls thereof to orbit in mutually opposite directions.

16. An orbital ball flow detector as in claim 15, wherein the orbital tracks of said pair of orbital ball flow detectors are coaxial and have different orbital track diameters.

17. An orbital ball flow detector as in claim 15 wherein said orbital ball flow detectors have equal track diameters an parallel flow passages.

* * * * *